Figure 3:
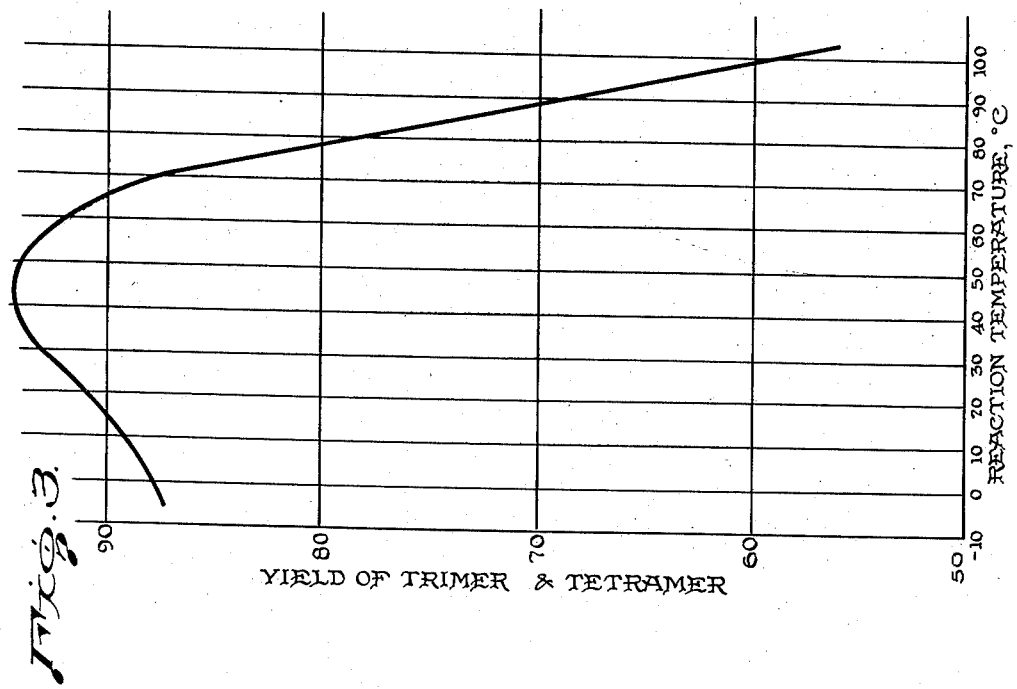

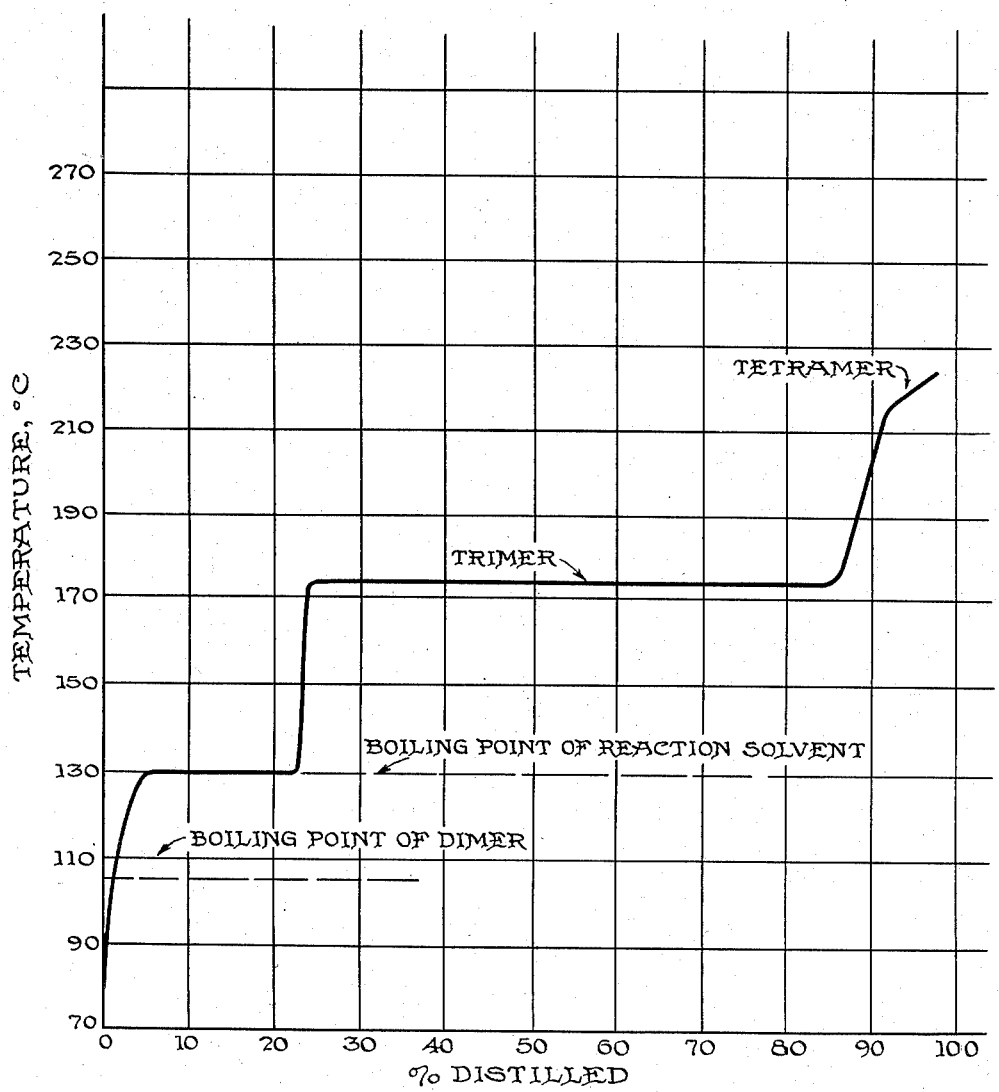

Patented Mar. 11, 1952

2,588,426

UNITED STATES PATENT OFFICE 2,588,426

PREPARATION OF TRI-ISOBUTYLENE

Donald R. Stevens, Wilkinsburg, and Robert S. Bowman, Pittsburgh, Pa., assignors to Gulf Research & Development Company, Pittsburgh, Pa., a corporation of Delaware Application December 4, 1947, Serial No. 789,746

5 Claims. (Cl. 260—683.15)

This invention relates to an improved process for the preparation of tri-isobutylene, and in particular concerns a process whereby isobutylene is polymerized to form tri-isobutylene with minimum formation of other isobutylene polymers.

It is well known that under the influence of various catalysts isobutylene undergoes polymerization to form products ranging in molecular weight from that of the dimer to values as high as 50,000 or more. These products vary in physical form from light mobile liquids to resinous or rubber-like solids depending upon the particular catalyst employed and the temperature at which the polymerization reaction is carried out. All of such products have utility in the arts, but those of lower molecular weight, especially the trimer and to a somewhat lesser extent the tetramer, are of particular value, either as such or in hydrogenated form, as motor fuels of the so-called "safety" type since they combine high octane value with relatively high flash point. Accordingly, many attempts have been made to control the polymerization of isobutylene so as to produce a polymeric product containing a high proportion of the trimer and/or the tetramer, and while such attempts have been successful to a certain extent, the yield of desired product attained has heretofore been far below the theoretical maximum.

It is accordingly an object of the present invention to provide a process whereby isobutylene is polymerized to obtain a high yield of low molecular weight polymers useful as motor fuels.

Another object is to provide a method for preparing tri-isobutylene in high yield from isobutylene.

A further object is to provide a method of controlling the polymerization of isobutylene whereby the polymerization reaction does not proceed substantially beyond the formation of the trimer and tetramer.

A still further object is to provide a method for polymerizing isobutylene to low-boiling polymers with minimum formation of the dimer.

Other objects will be apparent from the following description of the invention, and various advantages not specifically referred to herein will occur to those skilled in the art upon employment of the invention in practice.

In accordance with the above and related objects, we have found that isobutylene may be selectively polymerized to form a product consisting almost exclusively of the trimer and tetramer, and in which the trimer greatly predominates, through the use of a particular type of catalyst while maintaining the reaction temperature between relatively narrow limits. More specifically, we have found that by employing a boron trifluoride-ether complex as the catalyst and a reaction temperature between about 0° C. and about 90° C., the polymerization of isobutylene takes place in such manner that the polymeric product obtained comprises a very high proportion of the trimer, a considerably smaller proportion of the tetramer, and only very small amounts of the dimer and polymers higher than the tetramer. We have further found that the trimeric product so obtained is of exceptional purity, boiling over such a narrow range that it evidently comprises only one or at most two of the several possible isomers of tri-isobutylene.

In the accompanying drawings, Figure 1 represents a typical distillation curve of the product obtained by polymerizing isobutylene in accordance with the process of the invention. It will be noted that no noticeable amount of dimer is formed, and that after the reaction solvent has distilled off, the product consists almost exclusively of the trimer and only a very small amount of tetramer.

Figure 2:
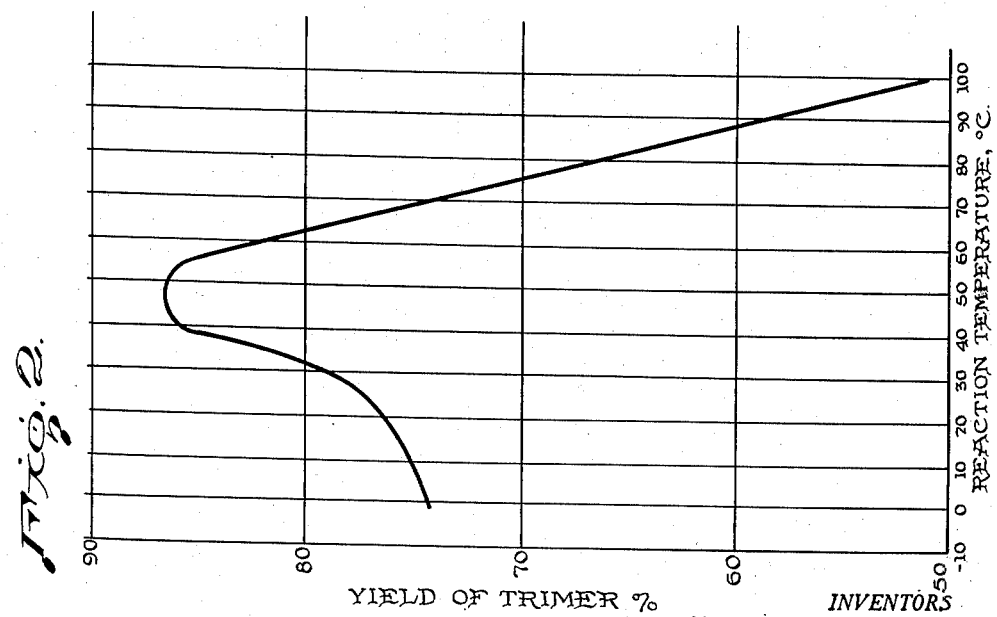

Figures 2 and 3 illustrate graphically the effect of temperature on the polymerization of isobutylene employing a boron trifluoride-ether complex as the catalyst in accordance with the invention. The curve of Figure 2 is that obtained by plotting yield of trimer versus reaction temperature, and the curve of Figure 3 is that obtained by plotting the combined yields of trimer and tetramer versus reaction temperature. It will be noted from these curves that highest yields of the trimer and tetramer combined are obtained when the reaction temperature is maintained between about 0° C. and about 90° C., and that highest yields of the trimer alone are obtained when operating at temperatures between about 15° C. and about 70° C.

The process of the invention is carried out simply by contacting isobutylene with a boron trifluoride-ether complex while maintaining a reaction temperature between about 0° C. and about 90° C. to obtain a polymeric product from which the desired tri-isobutylene may be separated by fractional distillation or other suitable means. The reaction takes place readily with the evolution of heat, and consequently it is convenient to carry out the polymerization in the presence of a reaction solvent to assist in the dissipation of heat and control of the reaction temperature. Such solvent will also promote intimate contact between the isobutylene and the catalyst. The solvent employed must be inert as far as the reaction is concerned, i. e., it must not react with any of the reaction components at the temperatures involved. In general, suitable inert reaction solvents are non-polar organic liquids such as paraffin hydrocarbons, aromatic hydrocarbons, halogenated paraffin and aromatic hydrocarbons, etc. The use of such inert reaction solvents is not essential to successful practice of the invention, however, since temperature control and removal of heat may be effected in other ways, e. g., by employing a reaction vessel fitted with cooling coils or by circulating the reaction mixture through a suitable heat exchanger. In cases where the boron trifluoride-ether complex is a solid, e. g., the complex of boron trifluoride and di-isopropyl ether, the use of an inert reaction solvent is indicated in order to secure intimate contact between the reactant and the catalyst.

Any of the boron trifluoride-ether complexes may be employed as the catalyst in accordance with the invention, although the diethyl ether complex is usually preferred by reason of its low cost and commercial availability. The various ether complexes differ slightly as regards the type of polymeric product formed. In general it has been found that the complexes of boron trifluoride with di-alkyl ethers, e. g., dimethyl ether, diethyl ether, di-isopropyl ether, di-isoamyl ether, di-octadecyl ether, ethyl propyl ether, etc.; cyclic ethers, e. g., dioxane, tetrahydrofurane, etc.; aryl-substituted alkyl ethers, e. g., dibenzyl ether, etc., influence the polymerization reaction so as to form the trimer in optimum yield and of a very narrow boiling range. The boron trifluoride complexes with alkyl-aryl ethers, e. g., methylphenyl ether, etc., appear to effect a small increase in the formation of higher polymers and to produce a trimer product of somewhat wider boiling range. Any of the ether complexes of boron trifluoride may be prepared simply by passing gaseous boron trifluoride into the ether at ordinary temperatures until the desired increase in weight is attained. Usually the complex will contain the boron trifluoride and ether in equimolecular proportions since such complexes appear to have greatest catalytic activity. However, complexes of fractional or multi-molecular proportions may be employed if desired. The amount of catalyst employed may be varied between wide limits, but in the interests of economy is usually kept as low as is consistent with optimum yield of the desired product. Ordinarily between about 0.01 and about 0.2 moles of the catalyst are employed per mole of isobutylene.

The polymerization reaction is carried out by introducing the isobutylene into a liquid body of the catalyst in a reaction vessel equipped with means for maintaining the desired temperature and provided with efficient agitation. As previously explained, an inert reaction solvent may be employed if desired. Upon completion of the reaction, the polymeric product is washed several times with dilute alkali and water to remove the catalyst, and is finally dried and fractionally distilled to isolate the desired product. The curve given in Figure 1 illustrates the course of a typical fractional distillation of the product obtained by the procedure just described, employing a reaction temperature of about 40° C., an equimolecular boron trifluoride-diethyl ether complex as the catalyst, and chlorobenzene as an inert reaction solvent. It will be noted that there is obtained very little if any dimer, and that after removal of a fraction consisting of the chlorobenzene solvent, there is obtained a large fraction consisting of the trimer, followed by a small fraction containing the tetramer.

The following examples will illustrate a number of ways in which the principle of the invention has been applied, but are not to be construed as limiting the same. All proportions are given as parts by weight.

*Example 1*

Approximately 6.0 parts of commercial boron trifluoride-diethyl etherate were dissolved in 56.5 parts of chlorobenzene and placed in a reaction vessel equipped with a high-speed motor-driven stirrer and mounted in a water-bath. Isobutylene was introduced below the surface of the catalyst solution at the maximum rate of absorption, i. e., at such a rate that a small amount of unabsorbed isobutylene continuously passed out of the vessel through an exit flowmeter. Addition of isobutylene in this manner was continued for 1.5 hours during which time the temperature of the contents of the vessel was maintained at 40 C. by adjustment of the water-bath temperature. At the end of the 1.5-hour period, 171.0 parts of isobutylene had been absorbed in the liquid catalyst. The contents of the vessel were then removed and were washed once with about 50 parts of ten per cent aqueous sodium hydroxide and twice with water. After drying over sodium sulfate, the product was fractionally distilled through an 18-plate column. The following fractions were obtained:

| Fraction No. | Boiling Range, °C. | Vol. percent | Identity |
|---|---|---|---|
| 1 | 80.8°–130.3° C./760 mm | 5.4 | Low-boiling. |
| 2 | 130.3° C./760 mm | 16.8 | Chlorobenzene. |
| 3 | 130.3°–174.1° C./760 mm | 2.0 | Transition material. |
| 4 | 174.1°–175.2° C./760 mm | 56.3 | Trimer. |
| 5 | 73°–75° C./20 mm | 6.9 | Do. |
| 6 | 75°–118.5° C./20 mm | 5.8 | Transition material. |
| 7 | 118.5°–123.0° C./20 mm | 4.4 | Tetramer. |
|  |  | 2.4 | Still Hold up and loss. |

The weight of the trimer fraction was 144 parts, corresponding to a yield of 84.2 per cent of the theoretical. The combined weight of trimer and tetramer was 159.5 parts, corresponding to a yield of 93.2 per cent of the theoretical.

*Examples 2–7*

A series of five runs was carried out following exactly the procedure described above in Example 1, except that the reaction temperatures were varied over the range from 4° to 100° C. The data obtained are summarized below:

Time of reaction . 1.5 hours
Reaction temperature _____ As indicated.
Pressure _____ Atmospheric.
Catalyst _____ Boron-trifluoride-diethyl etherate, 6.0 parts.
Reaction solvent _ Chlorobenzene, 56.5 parts.

| Example No. | 2 | 3 | 4 | 5 | 6 | 7 |
|---|---|---|---|---|---|---|
| Reaction Temperature, °C. | 4.0 | 25.0 | 40.0 | 55.0 | 70.0 | 100.0 |
| Isobutylene Absorbed, parts | 196.0 | 195.0 | 171.0 | 242.5 | 168.5 | 155.0 |
| Yield of Dimer, parts |  |  |  | 8.0 |  | 53.0 |
| Yield of Trimer, parts | 139.0 | 148.0 | 144.0 | 206.0 | 124.0 | 77.4 |
| Yield of Tetramer, parts | 31.0 | 29.0 | 15.5 | 20.0 | 25.0 | 10.8 |
| Yield of Trimer, percent | 74.8 | 76.8 | 85.5 | 85.2 | 73.8 | 51.2 |
| Yield of Trimer and Tetramer, percent | 91.3 | 91.8 | 94.7 | 93.4 | 88.7 | 58.4 |

*Examples 8–11*

A series of four runs was carried out following exactly the procedure described above in Example 1, except that the nature of the reaction solvent was varied. The data obtained are summarized below:

Time of reaction __ 1.5 hours.
Reaction temperature _____ 25° C.
Pressure _____ Atmospheric.
Catalyst _____ Boron trifluoride-diethyl etherate, 6.0 parts.
Reaction solvent __ As indicated, 56.5 parts.

| Example No. | 8 | 9 | 10 | 11 |
|---|---|---|---|---|
| Solvent | None | Benzene | Chlorobenzene | Chloroform. |
| Isobutylene Absorbed, parts | 126.5 | 216.0 | 195.0 | 216.0 |
| Yield of Dimer, parts | | | | Trace |
| Yield of Trimer, parts | 99.0 | 151.0 | 148.0 | 151.0 |
| Yield of Tetramer, parts | 18.0 | 34.7 | 29.0 | 39.0 |
| Yield of Trimer, percent | 79.5 | 72.0 | 76.8 | 73.9 |
| Yield of Trimer and Tetramer, percent | 94.0 | 88.5 | 91.8 | 93.1 |

*Examples 12—20*

A series of nine runs was carried out following the procedure described above in Example 1, except that a variety of different boron trifluoride-ether complexes were employed as catalysts, and a reaction solvent was employed only when the catalyst was a solid. With the exception of the diethyl ether complex, which was a commercial product, each of the ether complexes was prepared by initially treating the ether with sodium hydride to remove any peroxides, water, or alcohols. The ether was then fractionally distilled, and gaseous boron trifluorides was passed in at room temperature until the increase in weight showed the ether and boron trifluoride to be present in equimolecular proportions. In each run, the catalyst was employed in an amount equivalent to 0.042 mole. The data obtained are summarized below:

Time of reaction _____ 1.5 hours.
Reaction temperature ___ 25°-30° C.
Pressure _____ Atmospheric.
Catalyst _____ As indicated, 0.042 mole.

| Example No. | Ether Complex Employed as Catalyst | Yield Trimer, Percent | Yield Trimer and Tetramer, Percent |
|---|---|---|---|
| 12 | Di-ethyl ether | 79.5 | 94.0 |
| 13 | Di-n-butyl ether | 77.2 | 93.0 |
| 14 | Di-n-octyl ether | 60.5 | 76.3 |
| 15 | Di-n-dodecyl ether | 74.8 | 91.7 |
| 16 | Di-isopropyl ether [1] | 74.5 | 88.8 |
| 17 | Pentamethylene oxide | 71.0 | 93.2 |
| 18 | 1,4-Dioxane [2] | 73.5 | 87.5 |
| 19 | 1,4-Dioxane [1][3] | 70.3 | 88.2 |
| 20 | Hydroquinone diethyl ether [1] | 42.5 | 89.7 |

[1] Complex was solid, and hence was employed in solution in benzene.
[2] 1:1 Molecular ratio complex. Run made at 55°-60° C. to maintain catalyst in liquid state.
[3] 2:1 Molecular ratio complex.

While the preceding examples and detailed description refer to the process of the invention as being carried out in a batch-wise manner, it will be clear to those skilled in the art that the process is equally adaptable to continuous or semi-continuous operation under superatmospheric or reduced pressure through the use of known engineering techniques. Similarly, the examples show fractional distillation of the polymeric product to isolate the trimer and tetramer as separate fractions. Such procedure will be followed where it is desired to obtain these products in relatively pure form for use as chemical intermediates or otherwise. Where it is desired to produce a hydrocarbon mixture suitable for use in the manufacture of motor fuel, for example, a single fraction distilling between about 170° C. and about 245° C. under atmospheric pressure may be collected. Such fraction will consist essentially of a large proportion of the trimer, a substantially smaller proportion of the tetramer, and a very small proportion of intermediate material.

Other modes of applying the principle of our invention may be employed instead of those explained, change being made as regards the process herein disclosed provided the step or steps stated by any of the following claims, or the equivalent of any such stated step or steps, be employed.

We, therefore, point out and distinctly claim as our invention:

1. A process for preparing narrow boiling range tri-isobutylene which comprises introducing isobutylene below the surface of a liquid body comprising an equimolecular boron trifluoride-ether complex at substantially the maximum absorption rate while maintaining said liquid body at about 15° to 70° C. and at atmospheric pressure to form a resultant product consisting predominantly of narrow boiling range tri-isobutylene and being substantially free of di-isobutylene, washing the resultant product with aqueous alkali and water, and fractionally distilling the washed product to recover tri-isobutylene boiling over a narrow temperature range.

2. A process according to claim 1 in which said liquid body comprises an equimolecular boron trifluoride-dialkyl ether complex.

3. A process according to claim 1 in which said liquid body comprises an equimolecular boron trifluoride-diethyl ether complex.

4. A process according to claim 1 in which said liquid body comprises an equimolecular boron trifluoride-ether complex and an inert solvent.

5. A process according to claim 4 in which said inert solvent is chlorobenzene.

DONALD R. STEVENS.
ROBERT S. BOWMAN.

REFERENCES CITED

The following references are of record in the file of this patent:

UNITED STATES PATENTS

| Number | Name | Date |
|---|---|---|
| 2,363,221 | Bannon | Nov. 21, 1944 |
| 2,446,947 | Munday et al. | Aug. 10, 1948 |

FOREIGN PATENTS

| Number | Country | Date |
|---|---|---|
| 801,883 | France | Aug. 20, 1936 |

OTHER REFERENCES

Chem. Abstracts, vol. 41, No. 12, page 3946 (June 20, 1947), citing Topchiev et al., Neftyanoe Khoz. No. 11, 45–50 (1946).

Chem. Abstracts, vol. 42, page 1555 (1948), citing Topchiev et al., Bull. acad. sci. U.R.S.S., Classe sci. tech. (1947), 809–12.